(12) United States Patent
Mathewson

(10) Patent No.: US 7,832,867 B2
(45) Date of Patent: Nov. 16, 2010

(54) RETINAL SCAN DEVICE WITH REMOVABLE EYEPIECE AND ONBOARD DATA STORAGE

(75) Inventor: Edward Mathewson, Mclean, VA (US)

(73) Assignee: Lenovo (Singapore) Pte Ltd., Singapore (SG)

( * ) Notice: Subject to any disclaimer, the term of this patent is extended or adjusted under 35 U.S.C. 154(b) by 869 days.

(21) Appl. No.: 11/428,382

(22) Filed: Jul. 1, 2006

(65) Prior Publication Data

US 2008/0000974 A1   Jan. 3, 2008

(51) Int. Cl.
*A61B 3/10* (2006.01)
(52) U.S. Cl. .................. 351/211; 351/206; 235/472.01
(58) Field of Classification Search ............ 235/472.01; 351/206, 211, 218; 600/318, 162
See application file for complete search history.

(56) References Cited

U.S. PATENT DOCUMENTS

| | | | | |
|---|---|---|---|---|
| D302,153 S | * | 7/1989 | Karecki | D14/384 |
| 5,845,733 A | * | 12/1998 | Wolfsen | 340/5.53 |
| 5,892,568 A | * | 4/1999 | Carter | 351/218 |
| 7,331,669 B2 | * | 2/2008 | Elsner | 351/206 |
| 7,448,753 B1 | * | 11/2008 | Chinnock | 351/206 |
| 2002/0151774 A1 | * | 10/2002 | Soller et al. | 600/318 |
| 2004/0218144 A1 | * | 11/2004 | Silverbrook et al. | 351/205 |
| 2006/0146284 A1 | * | 7/2006 | Collins et al. | 351/215 |

* cited by examiner

*Primary Examiner*—Ahshik Kim
(74) *Attorney, Agent, or Firm*—Fox Rothschild LLP

(57) ABSTRACT

A method and architecture are provided for obtaining and authenticating a retinal scan using a host device, such as a laptop or hand-held computer, in a manner that is ergonomically sound and is easy to use. A PCMCIA card is used to obtain and authenticate retinal scans. The PCMCIA card includes a removable retinal-scanning eyepiece and an onboard software component for verifying retinal scans. A wired or wireless (e.g., infrared link, Bluetooth, etc.) connection is provided for delivering the retinal scan data from the retinal-scanning eyepiece to the PCMCIA card. The authentication is performed securely on the PCMCIA card and the scan is not retained in the laptop memory.

8 Claims, 3 Drawing Sheets

RETINAL SCAN DEVICE WITH REMOVABLE EYEPIECE AND ONBOARD DATA STORAGE

BACKGROUND OF THE INVENTION

1. Field of the Invention

This invention relates to the field of portable means for obtaining retinal scans and, more particularly, to PCMCIA retinal scan cards.

2. Description of the Related Art

Personal computers provide access to computing power for individuals, either as stand-alone machines or as terminals for connecting to a network of other computers. As personal computers have become more available and more powerful, providing effective security for such personal computers and the data and devices accessible therethrough has become more of an issue. Ideally, it would be desirable for the full computing power of the personal computer and its associated network to be available quickly and easily with no overhead to an authorized user, and be completely denied to an unauthorized user.

Biometric authentication is the measurement and analysis of human physical and behavioral characteristics to identify an individual. Fingerprint sensing, retinal scanning, signature verification, and hand geometry analysis are examples of known biometric authentication techniques. Using biometric authentication to determine who is authorized to use a resource such as a personal computer or to access a restricted area is well known in the art and many laptops now frequently include a built-in fingerprint sensor to assist in the authorization process.

Retinal scanning technology has been implemented through the inclusion of a retinal sensor in a PCMCIA card that is insertable into a computing device. Used in connection with software stored on the computing device, the technology can be used to allow or deny access to the computing device. An example of this technology can be found in U.S. Pat. No. 6,592,031 to Klatt. While this configuration functions sufficiently, it is difficult to use, since the user must scan his or her retina by positioning his or her eye next to the PCMCIA card, which is inserted in the computer when in use. This is not ergonomically sound and can be awkward and limiting in functionality.

SUMMARY OF THE INVENTION

This invention provides a method and architecture for obtaining and authenticating a retinal scan using a host device, such as a laptop or hand-held computer, in a manner that is ergonomically sound and is easy to use. A PCMCIA card is used to obtain and authenticate retinal scans. The PCMCIA card includes a removable retinal-scanning eyepiece and an on-board software component for verifying retinal scans. A wired or wireless (e.g., infrared link, Bluetooth, etc) connection is provided for delivering the retinal scan data from the retinal-scanning eyepiece to the PCMCIA card. The authentication is performed securely on the PCMCIA card and the scan is not retained in the laptop memory.

DETAILED DESCRIPTION OF THE PREFERRED EMBODIMENTS

Figure 1:
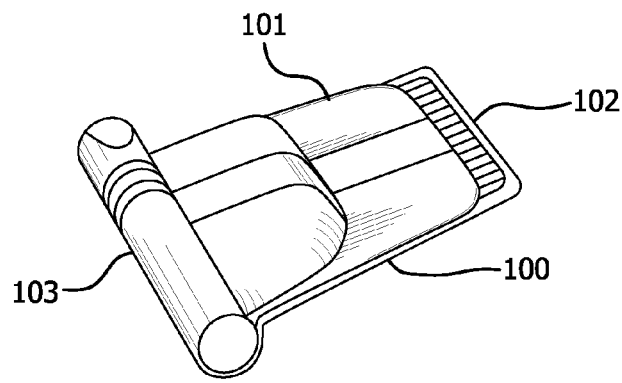
FIG. 1 illustrates a PCMCIA card configured in accordance with the present invention.
Figure 2:
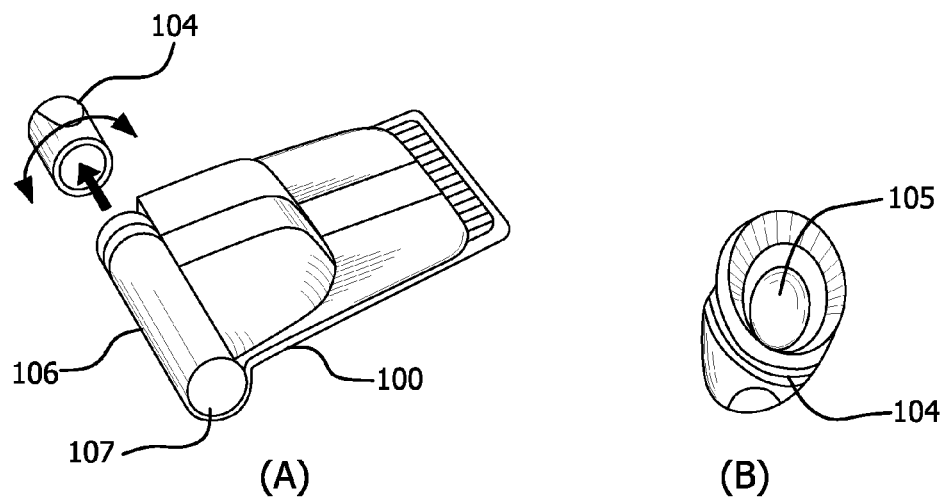
FIGS. 2A and 2B illustrate functional aspects of a preferred embodiment of PCMCIA card of the present invention in greater detail.

The present invention, described in more detail below, is a PCMCIA card device used to gather and authenticate retinal scans in connection with a host device such as a laptop or hand-held computer. The device includes three components to achieve authentication: a PCMCIA interface, a removable retinal scan apparatus, and a software component, stored on the PCMCIA device, to perform the authentication. In a preferred embodiment the link between the PCMCIA card and the retinal scan apparatus is an infrared link. The results of the retinal scans can be used to authenticate access to logical devices connected to or part of the host device, including the host device itself.

FIGS. 1-4 illustrate the present invention. A PCMCIA card 100 includes a card body 101 and a connector 102. This general configuration is a typical arrangement for a PCMCIA card and is well known. In accordance with the present invention, a sensor element 103 is situated at the end of the PC card body 101 opposite connector 102, and, as described more fully below, includes a removeable retinal-scanning eyepiece 104. The PCMCIA card 100 slides into a slot on a host device, e.g., a personal computer, typically a laptop or handheld computer, in a well known manner. Electrical connections on connector 102 provide various electrical connections between the host computer device and the PCMCIA card 100 in a well known manner. Such electrical connections can include power connections and bus connections for routing data between the host device and the PCMCIA card 100.

FIGS. 2A and 2B show the functional aspects of a preferred embodiment of PCMCIA card 100 of the present invention in greater detail. As shown in FIGS. 2A and 2B, the sensor element 103 includes detachable retinal-scanning eyepiece 104 that is detachable from a wireless receiver housing 106. Wireless receiver housing 106 includes threading elements or other means for coupling detachable retinal-scanning eyepiece 104 to the wireless receiver housing 106. Any known means for coupling the detachable retinal-scanning eyepiece and the wireless receiver housing can be utilized.

FIG. 2B illustrates detachable retinal-scanning eyepiece 104 in its removed state. As shown in FIG. 2B, detachable retinal-scanning eyepiece 104 has a cup-shaped area which is held up in front of the user's eye and includes therein a retinal sensor 105 for detecting retinal data in a well known manner. Detachable retinal-scanning eyepiece 104 also houses wireless transmission circuitry capable of transmitting data obtained via human retina sensor 105, using well known transmission techniques. If a wired version is utilized (not shown), a connection wire will connect retinal sensor 105 to the PCMCIA card to enable data transfer therefrom.

As shown in FIG. 2A, wireless receiver housing 106 includes a wireless receiving port 107. Wireless receiver port 107 is simply provides a mounting element for detachable retinal-scanning eyepiece 104 and, in a wireless configuration, provides a receiving port for receipt of wireless data signals from detachable retinal-scanning eyepiece 104. This wireless receiving port 107 includes known circuitry that is capable of receiving data transmitted by the wireless transmission circuitry of detachable retina-scanning eyepiece 104. Although not necessary, if desired, both detachable retinal-scanning eyepiece 104 and wireless receiver housing 106 can be equipped with capability to both transmit and receive wireless transmissions; however, for the purpose of the embodiment of the present invention illustrated in FIG. 2A, it is only necessary that detachable retinal-scanning eyepiece 104 be configured to transmit data wirelessly, and that wireless receiver housing 106 be configured to receive wireless transmissions using well known techniques. Further, if a wired version is used, wireless receiver housing 106 serves simply as a mounting piece for detachable retina-scanning eyepiece 104 and as a via for the connection wire mentioned above.

Figure 3:
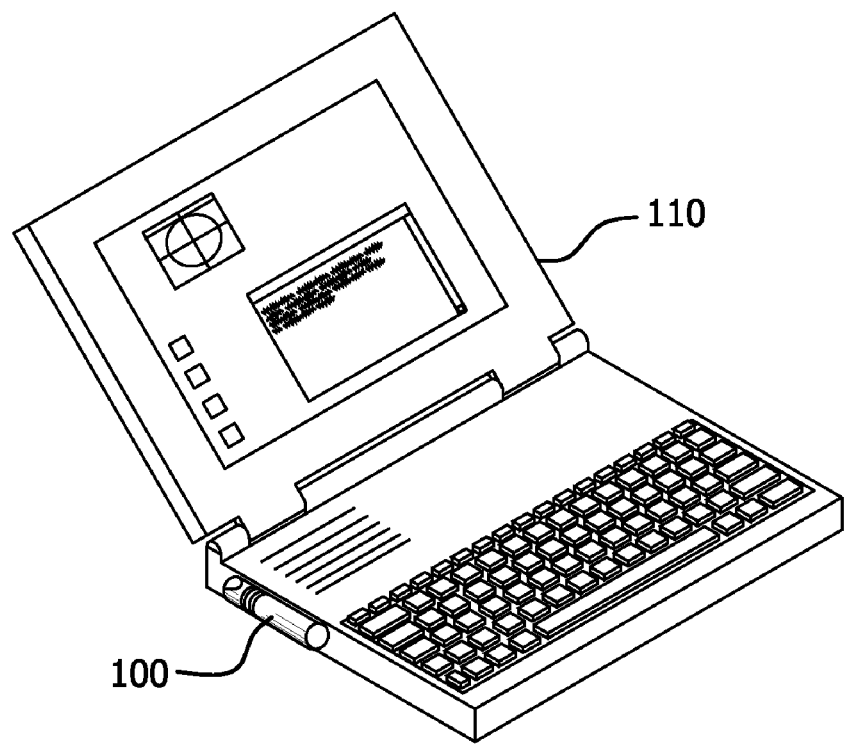
FIG. 3 illustrates a host computer the PCMCIA card of the present invention inserted therein.

PC card body 101 contains processing circuitry and storage elements for storing software programs and processing data received by wireless receiver port 107. In a well known manner, wireless receiver port 107 is coupled to this circuitry, as shown in more detail in FIG. 4, discussed further below. FIG. 3 illustrates a host computer 110 with the present invention, PCMCIA card 100, inserted therein.

Figure 4:
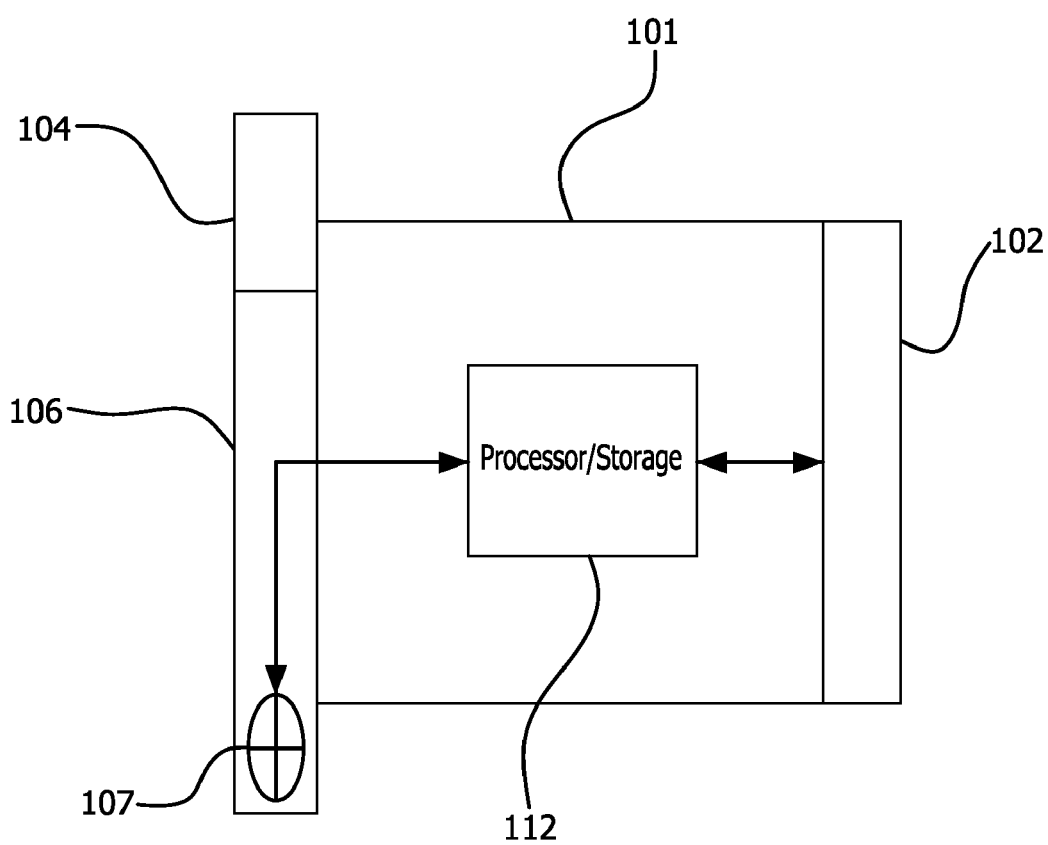
FIG. 4 illustrates a block diagram of circuit elements useable to embody the present invention.

FIG. 4 illustrates a block diagram of circuit elements useable to embody the present invention. It is noted that the specific circuitry utilizes known circuit components and configurations. Referring to FIG. 4, a processing/storage element 112 is coupled to wireless receiver port 107 so as to be able to transmit and receive data, control signals, and the like therebetween. Further, processing/storage element 112 is coupled to connector 102 so as to enable communication between the host device 110 and the processing/storage element 112. Processing/storage element 112 is shown conceptually; it is understood that processing/storage element can comprise one or more IC chips, each having various functions, so that there may be one or more separate storage IC's and one or more processor IC's. Such circuitry is well known. Processing/storage element 112 is configured with software for verifying retinal scans performed using the present invention and includes storage capability for temporarily storing retinal-scan data received from detachable retinal-scanning eyepiece 104. Preferably, all software needed to perform the retinal scanning function and retinal scan verification functions is stored on processing/storage device 112, thereby isolating this sensitive data from the host device 110 to increase the security of this device.

In operation, the detachable retinal-scanning eyepiece 104 is removed from the wireless receiver housing 106. Detachable retinal-scanning eyepiece 104 can be battery powered, e.g., using a watch, hearing air or other small battery type, and is activated for use. A user of the device places the detachable retinal-scanning eyepiece 104 in front of the eye to obtain the retinal scan and then communicates with the wireless receiver port 107 via a wireless data link, such as infrared. Preferably the data link uses an encrypted connection to transfer the results of the scan to the PCMCIA card. A button can be situated on the detachable retinal-scanning eyepiece 104 to initiate the scan in a well known manner, when the eyepiece is positioned in front of the user's eye and the button is depressed.

The data is received at wireless receiver port 107 and transmitted to processing/storage device 112. The authentication is performed securely on the PCMCIA card and, preferably, the scan is not retained in the laptop memory. A signature is generated from the scan and is compared with data stored in processing/storage device 112. A signal is generated by the software component on processing/storage device 112 and sent to host device 110 to grant or deny logical access to resources and/or devices on or connected to the host device 110.

Using the device of the present invention, retinal scanning can be easily performed using a portable device in a secure and simple manner. The data obtained from the scans is not transmitted to the host computer, thereby preventing a hacker from obtaining access to the host device and bypassing the safety elements of the PCMCIA card.

Although the examples given in the figures illustrate a wireless data transfer between detachable retinal-scanning eyepiece 104 and wireless receiving port 107 to get the data to processing/storage device 112, it is understood that a wired connection can also be used as long as the detachable retinal-scanning eyepiece 104 can be detached from and used remotely from the PCMCIA card itself.

Although the present invention has been described with respect to a specific preferred embodiment thereof, various changes and modifications may be suggested to one skilled in the art and it is intended that the present invention encompass such changes and modifications as fall within the scope of the appended claims.

I claim:

1. A portable retinal-scanning authentication device, comprising:
    a computing device having a housing having a connector at one end thereof configured to be inserted in a host device to provide communication with said host device; and
    processing and storage components mounted in said housing and connected to said connector; and
    a sensor element to detect retinal-scan data, coupled to said processing and storage components;
    wherein said sensor element includes a detachable retinal-scanning eyepiece housing a retinal sensor, said detachable retinal-scanning eyepiece being detachable from a mounting element of said sensor element when in use, said detachable retinal-scanning eyepiece including a coupling element for coupling said detachable retinal-scanning eyepiece for transferring data to said processing and storage components.

2. The device of claim 1, wherein said coupling element comprises an infrared transmitter in said detachable retinal-scanning eyepiece and an infrared receiver in said mounting element, said infrared receiver being coupled to said processing and storage components.

3. The device of claim 2, wherein said processing and storage components; process and store all data transmitted from said detachable retinal-scanning eyepiece; analyze said transmitted data and grant access to operational capabilities of said host device if said analyzed data can be authenticated; and deny access to operational capabilities of said host device if said analyzed data cannot be authenticated.

4. The device of claim 3, wherein said processing and storage components are not permitted to transfer said transmitted data to said host device.

5. A method of providing portable retinal-scanning authentication, comprising:
    configuring a computing device to have a housing having a connector at one end thereof such that said connector can be inserted in a host device to provide communication with said host device;
    processing and storage components mounted in said housing and connected to said connector; and
    providing a sensor element configured to detect retinal-scan data, coupled to said processing and storage components;
    wherein said sensor element includes a detachable retinal-scanning eyepiece housing a retinal sensor, said detachable retinal-scanning eyepiece being detachable from a mounting element of said sensor element when in use, said detachable retinal-scanning eyepiece including a coupling element for coupling said detachable retinal-scanning eyepiece for transferring data to said processing and storage components.

6. The method of claim 5, wherein said coupling element comprises an infrared transmitter in said detachable retinal-scanning eyepiece and an infrared receiver in said mounting element, said infrared receiver being coupled to said processing and storage components.

7. The method of claim 6, further comprising using said processing and storage components to: process and store all data transmitted from said detachable retinal-scanning eyepiece; analyze said transmitted data and grant access to operational capabilities of said host device if said analyzed data can be authenticated; and deny access to operational capabilities of said host device if said analyzed data cannot be authenticated.

8. A computer-readable medium comprising program instructions for providing retinal-scanning authentication, wherein execution of the program instructions by one or more processors of a computing system causes the one or more processors to carry out the steps of: processing and storing on one or more storage components all data transmitted from a detachable retinal-scanning eyepiece; analyzing said transmitted data and granting access to operational capabilities of a host device to which the computing device is connected if said analyzed data can be authenticated; and denying access to operational capabilities of said host device if said analyzed data cannot be authenticated.

* * * * *